No. 641,631. Patented Jan. 16, 1900.
N. I. ALLEN.
LOOM TEMPLE.
(Application filed July 21, 1899.)
(No Model.)
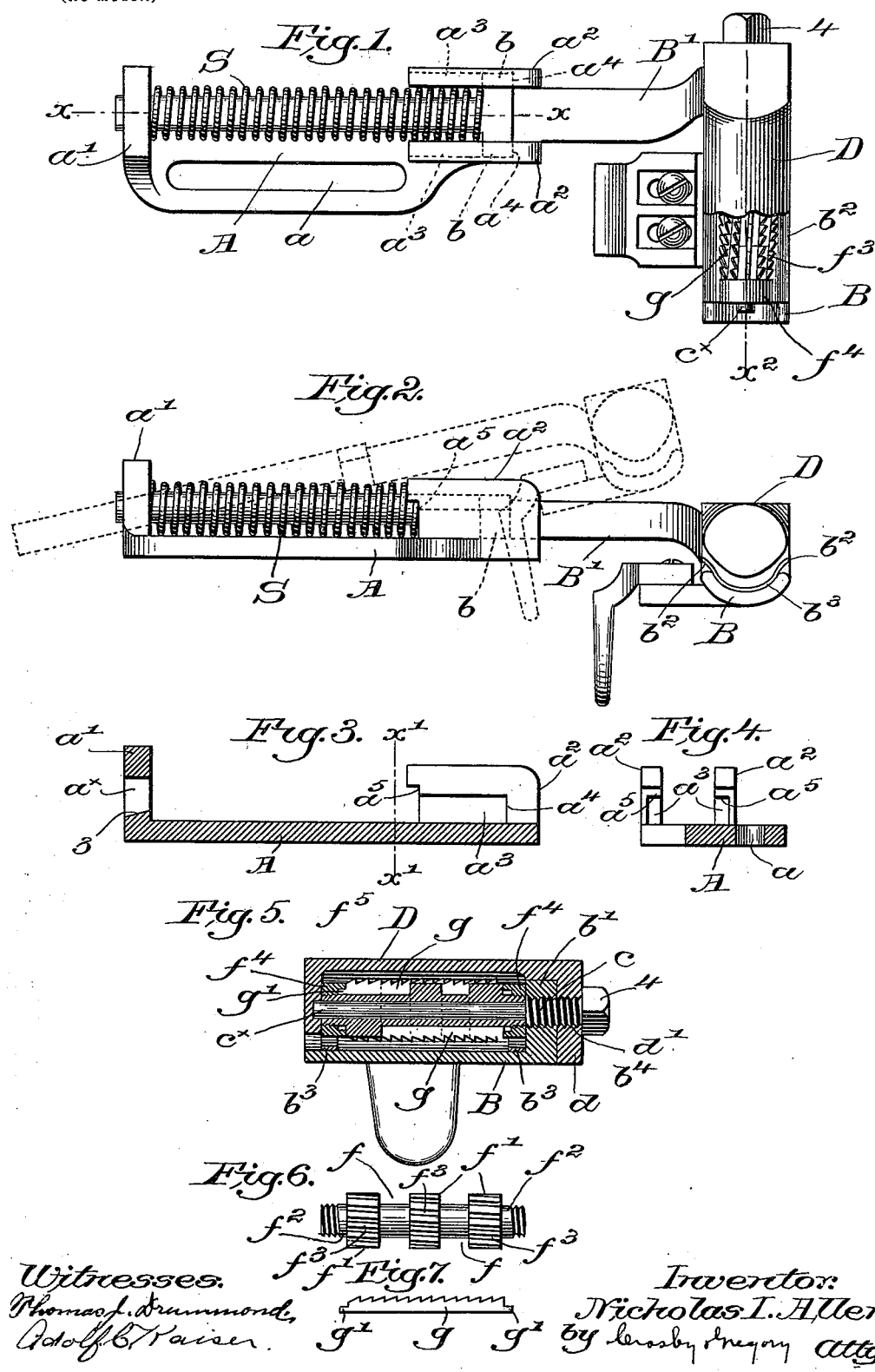

UNITED STATES PATENT OFFICE.

NICHOLAS I. ALLEN, OF EVERETT, MASSACHUSETTS, ASSIGNOR TO THE DRAPER COMPANY, OF PORTLAND, MAINE, AND HOPEDALE, MASSACHUSETTS.

LOOM-TEMPLE.

SPECIFICATION forming part of Letters Patent No. 641,631, dated January 16, 1900.

Application filed July 21, 1899. Serial No. 724,602. (No model.)

*To all whom it may concern:*

Be it known that I, NICHOLAS I. ALLEN, of Everett, county of Middlesex, State of Massachusetts, have invented an Improvement in Loom-Temples, of which the following description, in connection with the accompanying drawings, is a specification, like letters and numerals on the drawings representing like parts.

This invention relates to temples for looms; and it has for its object the production of a temple which may be quickly and easily removed from its stand or plate in which the shank of the temple-head normally reciprocates, locking means holding the parts securely in operative position under normal conditions.

Figure 1 is a top or plan view of a loom-temple embodying one form of my invention, the cap being partially broken out to show the tooth of the roll. Fig. 2 is a side elevation of the temple shown in Fig. 1, the head and shank being shown in dotted-line position as ready to be removed from or inserted into operative position on the stand. Fig. 3 is a longitudinal sectional detail of the stand, taken on the line $xx$, Fig. 1. Fig. 4 is a transverse sectional detail of the stand on the line $x'\,x'$, Fig. 3, looking to the right. Fig. 5 is a longitudinal sectional view of the cap, pod, and temple-roll on the line $x^2$, Fig. 1. Fig. 6 is a side elevation of the roll-body, showing the seats for the toothed blades; and Fig. 7 is a side elevation of one of the toothed blades detached.

I have herein shown the stand A provided with a longitudinal slot $a$ to receive the usual attaching-bolt by which the stand is secured to the breast-beam of the loom, and the stand is herein shown as provided at its inner end with an upturned transverse ear $a'$, said ear having a hole $a^\times$ therein, the bottom 3 of which is beveled rearwardly and downward, as clearly shown in Fig. 3, for a purpose to be described. The outer end of the stand is provided with two upturned and parallel ears $a^2$, extended longitudinally of the stand and provided on their inner faces with undercut grooves or guideways $a^3$, (see Figs. 3 and 4,) extended from the rear ends of the ears toward the front of the stand to form shoulders or stops $a^4$.

The temple-head has an attached pod B and shank B', adapted to slide longitudinally upon the stand under normal conditions, the shank being provided with lateral projections or lugs $b$, adapted to enter and slide in the guideways $a^3$ when the temple is in operative condition, the rear end of the shank at such time extending through the hole $a^\times$ in the ear $a'$ and being guided thereby as the temple-head and shank are reciprocated, a strong spring S being herein shown as coiled around the shank between the projections $b$ and the ear $a'$, the ears $a^2$ on the stand being far enough apart to admit the front end of the spring between them, as shown in Fig. 1, the spring normally maintaining the temple-head pressed outward with the projections $b$ against the stop-shoulders $a^4$.

Ordinarily the guideways $a^3$ prevent the shank from lifting, while permitting it to reciprocate; but when it is desired to remove the temple from the stand the shank is retracted till the projections $b$ are free of the guideways, and then the shank is tipped up, as in dotted-line position, Fig. 2, the beveled bottom of the hole $a^\times$ permitting such tipping of the shank, and the latter can then be withdrawn bodily from the ear $a'$. The reverse operation readily and quickly effects the assembling of the temple and stand in operative position.

The guideways on the one coöperating with the lateral projections on the other form locking means to maintain the stand and temple connected together under ordinary circumstances.

The entire separation of the head and stand is very desirable at times—as, for instance, when the operative finds it necessary to take out one or more picks.

Referring to Fig. 3, it will be noticed that the rear end walls of the ears $a^2$ are cut away or notched to leave shoulders $a^5$ at the entrances of and above the guideways $a^3$, and when it is desired to maintain the temple retracted without removing it altogether from the stand the head is pushed back until the projections $b$ rest against the shoulders $a^5$, the shank being slightly tipped up for the purpose.

I have herein shown the pod B as provided with means for pressing the cloth firmly against the teeth of the roll, such means being herein represented as a yielding rib $b^2$, extended longitudinally of the pod adjacent and above the edge thereof, the rib being preferably made of a piece of flattened wire bent at its ends transversely, as at $b^3$, and curved to conform to the interior of the pod, to which it is secured in any suitable manner, as by soldering.

I have herein shown a rib located adjacent each longitudinal edge of the pod to engage the cloth at each side of the roll, the ribs acting to hold the cloth firmly against the teeth, yet possessing sufficient elasticity to yield slightly when necessary.

The upturned end $b'$ of the pod (see Fig. 5) has a threaded hole $b^4$ to receive a screw-plug $c$, having a suitable polygonal head 4, a wooden journal $c^\times$ being secured to the plug in any usual manner, as by driving it into a hole in the plug and extending the length of the roll to be described, the body of the latter being made of metal and rotating on the wooden journal, which I prefer to saturate with oil, tallow, or some other antifriction compound to reduce the friction to a minimum.

The cap D may be of any usual construction, its downturned end $d$ having a hole $d'$ therein to receive the plug, the head 4 of the latter serving to press the end of the cap firmly against the end of the pod when the plug is screwed home, to thereby hold the cap in place. Manifestly the withdrawal of the screw-plug will release the cap and the roll can be instantly removed from the pod.

The roll itself comprises a body portion and detachable toothed blades, which are mounted on the body in grooves or seats extended from one to the other end of the body.

Referring to Figs. 5 and 6, the metallic body is herein shown as annularly grooved at $f$ to leave end and central cylindrical portions $f'$, the body being reduced at its ends, as at $f^2$, and exteriorly threaded, the body being centrally bored to receive the journal $c^\times$. The annular grooves $f$ are made to reduce the weight of the body, and they leave end and middle supports for the toothed blades to be described, said larger portions $f'$ having formed therein, as by saw-cuts, suitable grooves or seats $f^3$, extended in the direction of the length of the body, but at a slight angle to its longitudinal axis, to give the proper spiral arrangement to the teeth, and into each groove or seat is inserted a toothed blade $g$, which I have herein shown as reduced at its ends, as at $g'$, to project beyond the main body portion when the blades are in place.

Caps $f^4$, Figs. 1 and 5, countersunk at their inner ends, as at $f^5$, to embrace the reduced ends of the blades, are provided with threaded holes to screw onto the threaded extensions $f^2$ of the body of the roll, to thereby firmly hold the blades securely in place on the body.

Should one or more teeth become bent or broken, the particular blade can be readily removed and a new blade inserted.

By having blades with teeth of various degrees of evenness it will be obvious that the same body can be utilized to present a temple-roll having fine or coarse teeth, according to the class of work to be performed. This mode of constructing the toothed roll obviates the necessity for inserting very accurately the separate teeth or points in the body of the roll, as has been heretofore the practice.

Having described my invention, what I claim, and desire to secure by Letters Patent, is—

1. In a loom-temple, a temple-head having a shank provided with lateral projections, a stand having parallel undercut guideways open at their rear ends to receive said projections, stops at the front ends of said guideways, and a transverse ear at the inner end of the stand, apertured to receive the shank.

2. In a loom-temple, a stand having a shank-guide at its outer end, provided with undercut, parallel ways, a transverse ear at its inner end having an aperture with a rearwardly and downwardly beveled bottom, and a temple-head provided with a shank, the latter having lateral projections normally retained in place by the parallel ways of said guide and by the apertured ear, the beveled bottom of the latter permitting the shank to be tipped to withdraw the shank from or to insert it in its guide on the stand.

3. In a loom-temple, a temple-head having a shank provided with lateral projections, a stand having parallel upturned ears provided on their inner faces with undercut grooves to receive said projections, an apertured, transverse ear on the stand, to receive the shank, and stops at the rear ends of the parallel ears, to engage the projections on the shank and maintain the temple-head retracted.

In testimony whereof I have signed my name to this specification in the presence of two subscribing witnesses.

NICHOLAS I. ALLEN.

Witnesses:
JOHN C. EDWARDS,
AUGUSTA E. DEAN.